United States Patent Office 2,980,710
Patented Apr. 18, 1961

2,980,710

2-HALOANDROST-1-ENE-3,17-DIONES

Raymond E. Counsell and Paul D. Klimstra, Skokie, Ill., assignors to G. D. Searle & Co., Chicago, Ill., a corporation of Delaware No Drawing. Filed July 1, 1960, Ser. No. 40,194

4 Claims. (Cl. 260—397.3)

The present invention is concerned with 2-halogenated steroids and, more particularly, with 2-halo derivatives of 5α-androst-1-ene-3,17-dione as represented by the structural formula

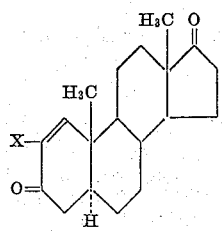

wherein X is a halogen atom of atomic weight less than 100.

The halogen atoms encompassed by X are fluorine, chlorine and bromine.

The 2-bromo and 2-chloro compounds of this invention are conveniently prepared by reaction of 1α,2α-epoxy-5α-androstan-3,17-dione with the appropriate hydrogen halide in a polar solvent medium. Typically, this epoxide in acetone is allowed to react with hydrobromic acid at room temperature for about one hour to produce 2-bromo-5α-androst-1-ene-3,17-dione.

A particularly suitable process for the manufacture of the 2-fluoro compound of this invention utilizes as the starting material, 3β-(p-toluenesulfonyloxy)-5α-androstan-17-one. A solution of this ester in collidine is heated at the reflux temperature of the mixture to afford 5α-androst-2-en-17-one. This olefin is epoxidized, typically with perbenzoic acid in benzene, to afford 2α,3α-epoxy-5α-androstan-17-one. Treatment of this epoxide with anhydrous hydrogen fluoride in a chloroform-tetrahydrofuran solution results in 2β-fluoro-3α-hydroxy-5α-androstan-17-one. Oxidation of this 3α-hydroxy compound, suitably in acetone with aqueous chromic acid, yields 2β-fluoro-5α-androstane-3,17-dione, which is epimerized by treatment in acetic acid with hydrobromic acid to yield 2α-fluoro-5α-androstane-3,17-dione. A solution of the latter substance in glacial acetic acid containing a catalytic quantity of hydrobromic acid is treated with bromine to afford 2β-bromo-2α-fluoro-5α-androstane-3,17-dione, which is dehydrobrominated by means of a solution of lithium chloride and lithium carbonate in dimethylformamide, resulting in the instant 2-fluoro-5α-androst-1-ene-3,17-dione.

The compounds of this invention exhibit valuable pharmacological properties. They possess, for example, hormonal activity as evidenced by their ability to evoke the type of androgenic response resulting from the administration of testosterone propionate.

The following examples illustrate the invention more fully, but should not be construed as limiting this invention either in spirit or in scope. It will be apparent to those skilled in the art that these examples can be modified in regard to both materials and methods without departing from the spirit of the invention. The temperatures disclosed in these examples are given in degrees centigrade (° C.), and quantities of materials are given in parts by weight unless otherwise noted.

Example 1

To a solution of one part of 1α,2α-epoxy-5α-androstane-3,17-dione in 60 parts of acetone is added 3.7 parts of 48% hydrobromic acid, and this reaction mixture is stored at room temperature for about one hour, then poured into a mixture of ice and aqueous sodium chloride. The resulting precipitate is collected by filtration, washed with water, and recrystallized from aqueous ethanol to yield pure 2-bromo-5α-androst-1-ene-3,17-dione, M.P. 179.5–180.5°; $[\alpha]_D = +94°$ (chloroform). This substance exhibits an ultraviolet absorption maximum at about 255 millimicrons with a molecular extinction coefficient of about 7600.

Example 2

A solution of one part of 1α,2α-epoxy-5α-androstane-3,17-dione in 32 parts of acetone and 10 parts of dioxane is treated with 3 parts of concentrated hydrochloric acid, and the resulting solution is allowed to stand at room temperature for about one hour, then diluted with a mixture of ice and aqueous sodium chloride. The solid product which precipitates is collected on a filter, washed thereon with water, and recrystallized from aqueous ethanol to produce pure 2-chloro-5α-androst-1-ene-3,17-dione, M.P. 146–148°; $[\alpha]_D = +117°$ (chloroform). It displays a maximum in the ultraviolet at about 247 millimicrons with a molecular extinction coefficient of about 9100.

Example 3

A mixture of 5 parts of 3β-(p-toluenesulfonyloxy)-5α-androstan-17-one and 350 parts of purified collidine is stirred and heated at reflux for about 4 hours. This reaction mixture is cooled, then treated with ice and 500 parts by volume of 1 N sulfuric acid. The resulting mixture is extracted with ether, and the organic layer is washed successively with ice-cold 1 N sulfuric acid, aqueous sodium bicarbonate, and water. This washed solution is dried and decolorized over a mixture of anhydrous sodium sulfate and activated carbon, then evaporated to dryness to afford 5α-androst-2-en-17-one, M.P. 103–105°. Recrystallization from methanol affords a pure sample, M.P. 105–106.5°; $[\alpha]_D = +163°$ (chloroform).

Example 4

To a solution of 8.4 parts of perbenzoic acid in 128 parts of benzene, cooled at 5°, is added 15 parts of 5α-androst-2-en-17-one, and the mixture is stirred until homogeneous, then stored at 5° for about 24 hours. The solution is allowed to come to room temperature, then washed successively with aqueus sodium carbonate and water, dried over anhydrous potassium carbonate, and evaporated to dryness to afford a solid residue. Recrystallization from methanol affords pure 2α,3α-epoxy-5α-androstan-17-one, M.P. about 123–126°; $[\alpha]_D = +104°$ (chloroform).

Example 5

Into a solution consisting of 21 parts of chloroform and 34 parts of purified tetrahydrofuran, cooled by means of an ice-calcium chloride bath, is bubbled 20.8 parts of anhydrous hydrogen fluoride. To this cooled and stirred mixture is added a solution of 12 parts of 2α,3α-epoxy-5α-androstan-17-one in 96 parts of chloroform over a period of about 2½ hours, during which time the addition of hydrogen fluoride is continued. The cooling bath is then removed and the reaction mixture is stirred for about 1½ hours longer, then poured slowly into about 1050 parts of concentrated aqueous potassium carbonate. This mixture is extracted with chloroform, and the organic extract is washed successively with water, aqueous sodium bicarbonate and water; then dried and decolorized over a mixture of anhydrous potassium carbonate and activated carbon. Evaporation of the solvents results in a yellow oil, which is adsorbed on silica gel and eluted with benzene-ethyl acetate to afford 2β-fluoro-3α-hydroxy-5α-androstan-17-one. Recrystallization from acetone-hexane yields a pure sample, M.P. about 184–185°; $[\alpha]_D = +97°$ (chloroform).

*Example 6*

A rapidly-stirred solution of 4 parts of 2β-fluoro-3α-hydroxy-5α-androstan-17-one in 40 parts of acetone is cooled and treated dropwise with an aqueous solution, 8 N in chromium trioxide and 8 N in sulfuric acid, until precipitation of the green-colored salts ceases. Dilution of the reaction mixture with ice and water results in formation of an oil, which is separated by extraction into methylene chloride. This organic solution is then washed with water, dried over anhydrous potassium carbonate, and concentrated in vacuo to yield an oil, which solidifies on standing. Recrystallization from aqueous methanol affords pure 2β-fluoro-5α-androstane-3,17-dione, M.P. 142–143°; $[\alpha]_D = +123°$ (chloroform).

*Example 7*

A stirred solution of 3 parts of 2β-fluoro-5α-androstane-3,17-dione in 75 parts of glacial acetic acid is treated with 17.8 parts of 48% hydrobromic acid, and the resulting mixture is stored at room temperature for about 22 hours. It is then poured slowly into an ice-water mixture, and the resulting precipitate is collected by filtration and dried to afford 2α-fluoro-5α-androstane-3,17-dione, M.P. about 203–205°.

*Example 8*

To a solution of 1.5 parts of 2α-fluoro-5α-androstane-3,17-dione and 0.15 part of 48% hydrobromic acid in 25 parts of glacial acetic acid is added dropwise over a period of about one hour, 0.8 part of bromine. This reaction mixture is poured slowly into ice and water, and the resulting precipitate is collected by filtration, washed successively with aqueous sodium bicarbonate and water, then dried to afford a solid, which contains 2β-bromo-2α-fluoro-5α-androstane-3,17-dione.

To a solution of this dried precipitate in 10 parts of dimethylformamide is added 0.45 part of lithium chloride and 0.27 part of lithium carbonate, and the resulting mixture is heated at reflux, under nitrogen, for about 4½ hours. It is then cooled and poured slowly into water. Extraction of this mixture with ether affords an organic solution, which is washed successively with aqueous sodium bicarbonate and water, then dried over anhydrous potassium carbonate. Distillation of the solvent in vacuo affords a glass-like residue which is adsorbed on a silica gel chromatographic column and eluted with 5% ethyl acetate in benzene. Concentration of the eluate followed by recrystallization of the resulting residue from acetone-hexane affords needle-like crystals of 2-fluoro-5α-androst-1-ene-3,17-dione, M.P. about 188–190°; $[\alpha]_D = +122°$ (chloroform).

What is claimed is:

1. A compound of the structural formula

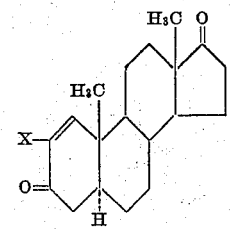

wherein X is a halogen atom of atomic weight less than 100.

2. 2-bromo-5α-androst-1-ene-3,17-dione.
3. 2-chloro-5α-androst-1-ene-3,17-dione.
4. 2-fluoro-5α-androst-1-ene-3,17-dione.

No references cited.